United States Patent [19]
Murase et al.

[11] Patent Number: 5,999,697
[45] Date of Patent: *Dec. 7, 1999

[54] APPARATUS FOR RECORDING AND/OR REPRODUCING STILL IMAGES

[75] Inventors: Hirofumi Murase, Kanagawa; Masato Kajimoto, Chiba; Toshihisa Yamamoto, Kanagawa, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/683,285

[22] Filed: Jul. 18, 1996

[30] Foreign Application Priority Data

Jul. 21, 1995 [JP] Japan ..................................... 7-207778

[51] Int. Cl.[6] ....................................................... H04N 5/91
[52] U.S. Cl. ............................................. 386/101; 386/96
[58] Field of Search ................................. 386/46, 95, 96, 386/104, 109, 112, 124, 125, 101, 106, 105, 39, 40; H04N 5/76, 5/91

[56] References Cited

U.S. PATENT DOCUMENTS

| | | |
|---|---|---|
| 5,018,017 | 5/1991 | Sasaki et al. . |
| 5,226,145 | 7/1993 | Moronaga et al. . |
| 5,467,129 | 11/1995 | Suzuki . |
| 5,528,293 | 6/1996 | Watanabe . |
| 5,596,565 | 1/1997 | Yonemitsu et al. ................... 369/275.3 |

FOREIGN PATENT DOCUMENTS

| | | |
|---|---|---|
| 0 390 421 | 10/1990 | European Pat. Off. . |
| 0 594 992 | 5/1994 | European Pat. Off. . |
| 0 651 553 | 5/1995 | European Pat. Off. . |
| 43 40 196 | 5/1994 | Germany . |
| 7-98890 | 4/1995 | Japan . |
| 2248707 | 4/1992 | United Kingdom . |

OTHER PUBLICATIONS

Institute of ELectrical Engineers, IS & T's Annual Conference Proceedings May 7–11, 1995, Washington DC, Watanabe M. et al. 'An Image Data File Format for Digital Still Camera', pp. 421–424.

Patent Abstract of Japan, JP 7–98890 Apr. 11, 1995.

Patent Abstracts of Japan, vol. 16, No. 316 (E–1231), Jul. 10, 1992 & JP 04 090280 A (Olympus Optical), Mar. 24, 1992.

Database Inspec Institute of Electrical Engineers, Stevenage, GB Inspec No. 5230640, Watanabe et al.: "An Image Data File Format for Digital Still Camera" XP002026026 & Final Program and Advance Printing of Papers, IS&T's 48th Annual Conference of the Society for Imaging Science and Technology, May 7–11, 1995, Washington, D.C. U.S.A., pp. 421–424.

*Primary Examiner*—Robert Chevalier
*Attorney, Agent, or Firm*—Frommer Lawrence & Haug, LLP; William S. Frommer

[57] ABSTRACT

A still image recording/reproducing apparatus for recording and/or reproducing still image data and audio data onto and/or from a recording medium, such as a magneto-optical disk. Characters and/or patterns may be provided with the still image. Additionally, the still image may be modified and/or the size thereof may be increased or decreased.

13 Claims, 12 Drawing Sheets

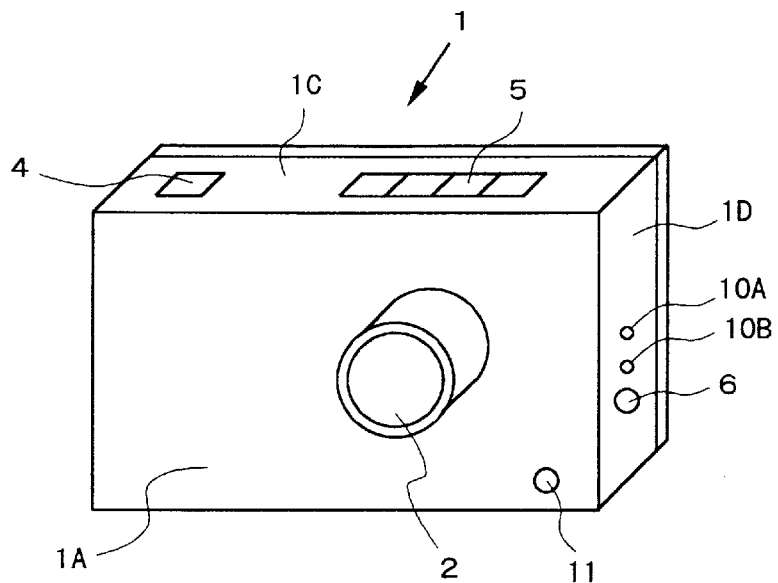
Fig. 1A
Fig. 1C
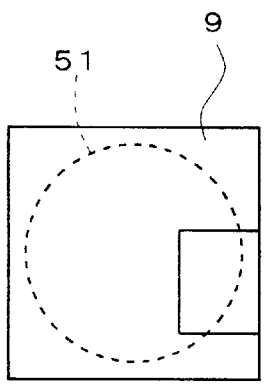
Fig. 1B
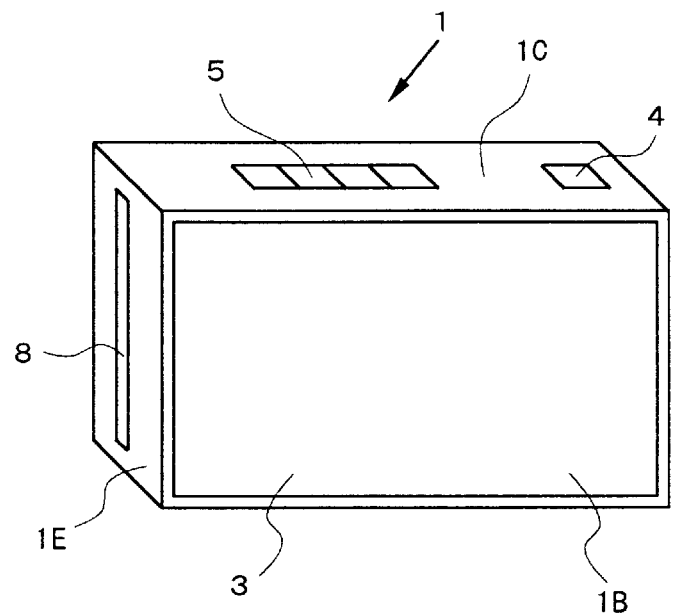

Fig. 12

| | ADDRESS (BYTES) |
|---|---|
| TABLE ID | 1 |
| NEXT TABLE POINTER (JUMP TO m+n BYTES) | 1 |
| RESERVED | 1 |
| MODE | 1 |
| COPY RIGHT / EDITING RIGHT | 1 |
| RESERVED | 1 |
| TOTAL TIME | 2 |
| STRAT TIME | 2 |
| EFFECTIVE TIME | 2 |
| RESERVED | 3 |
| CHARACTER IDENTIFICATION CODE | 1 |
| TITLE | 40 |
| BLANK DATA | |
| | L+m+n+1 |
| TABLE ID | L+m+n+2 |

PICTURE MD DATA SYSTEM DESCRIPTION
THE FOLLOWING IS AN EXAMPLE OF DIRECTORY STRUCTURE

APPARATUS FOR RECORDING AND/OR REPRODUCING STILL IMAGES

BACKGROUND OF THE INVENTION

The present invention relates to a video processing apparatus and method and, more particularly, to such apparatus and method for use with an electronic still camera for recording and/or reproducing still image digital video signals and audio data onto and/or from a recording medium such as an optical disk, a magneto-optical disk or a semiconductor memory.

In a digital recording type electronic still camera, an image of an object may be supplied through a photographing or charge coupled device (CCD) so as to obtain a video signal. Such video signal may be converted to digital form and compressed in accordance with an image compression technique of the Joint Photographic Experts Group (JPEG). The JPEG technique may compress still image data by using a discrete cosine transform (DCT) and length-variable coding. As a result, such JPEG technique may be able to compress colored still image data with a relatively high compression ratio, such as 1 to 1/100. The digital compressed video signal may thereafter be recorded on a recording medium.

The recording medium may be a magneto-optical disk which is contained in a housing or cartridge. Such magneto-optical disk may have an outer diameter of approximately 64 mm and a thickness of approximately 1.2 millimeters. Further, such magneto-optical disk may have a plurality of tracks for storing data with a track pitch of approximately 1.6 micrometers.

The above-described.magneto-optical disk/cartridge may be similar to a so-called mini-disk (MD) used to record audio data. Such disk may record approximately 140 Mbytes of data, which corresponds to approximately 365 still pictures in JPEG-compressed form and approximately 40 minutes of audio information in a so-called ATRAC (Adaptive Transform Acoustic Coding) form.

The above-described electronic still camera which records data in a digital form onto a magneto-optical disk has numerous advantages. For example, a relatively large number of still image data may be recorded on one disk, the quality of the recorded images may remain substantially high and may not substantially deteriorate over time, compilation of data is relatively easy, and still image data may be copied into a computer. Furthermore, such use is believed to increase in the future.

When taking photographs with an electronic still camera, an operator may wish to store audio data together with the still image data. Such audio data may include a narration pertaining to the circumstances of the respective photograph or photographs. Further, an operator may wish to record characters which provide information pertaining to the photograph(s). For example, such character(s) may describe the circumstances, places and/or dates of the photographs. Furthermore, an operator may wish to provide a framing or ornamental pattern(s) with the photographed image. Additionally, an operator may wish to increase or decrease the,size or scale of a still image(s) or deform such image(s).

OBJECTS AND SUMMARY OF THE INVENTION

An object of the present invention is to provide a recording/reproducing apparatus for recording and/or reproducing still image data and audio data.

Another object of the present invention is to provide a recording/reproducing apparatus as aforesaid which may record and/or reproduce characters which may describe circumstances, places and/or dates of a respective photograph image(s).

A further object of the present invention is to provide a recording/reproducing apparatus as aforesaid which may enable a desired frame or ornamental pattern(s) to be arranged on a photographed image.

A still further object of the invention is to provide Et recording/reproducing apparatus as aforesaid in which a photographed still image(s) may be relatively easily modified or increased or decreased in size or scale.

In accordance with an aspect of the present invention, a recording apparatus is provided which comprises a video entry device for introducing video data; image memory for storing the video data introduced by the video entry device; an image compressing device for compressing the video data introduced by the video entry device; a switching device for selectively choosing between the compressed video data and uncompressed video data from the video entry device; and a record device for recording the compressed video data and uncompressed video data.

In accordance with another aspect of the present invention, a camera apparatus for recording video and audio data to a recording medium having a management area and a program area is provided. The camera apparatus comprises a video entry device for introducing video data; a compression device for compressing the video data from the video entry device; a video memory device for storing the compressed video data from the compression device; an audio entry device for introducing audio data; an audio compression device for compressing the audio data from the audio entry device; and a recording device for recording the compressed video data and the compressed audio data to the program area of recording medium, and for recording file management data for managing the compressed video data and the compressed audio data to the management area of the recording medium.

In accordance with still another aspect of the present invention, a camera apparatus for reproducing video and audio data from a recording medium having a management area and a program area is provided. The camera apparatus comprises a reproducing device for reproducing compressed video and audio data in accordance with file management data stored in the management area of the recording medium; a video memory device for storing the reproduced compressed video data from the reproducing device; an expanding device for expanding the compressed video data from the video memory device; an audio memory device for storing the reproduced compressed audio data from the reproducing device; and an expanding device for expanding the compressed audio data from the audio memory device.

The present recording or reproducing apparatus may record and/or reproduce still images and audio data and may include an image compressing/expanding device for compressing/expanding video data and an audio compressing/expanding device for compressing/expanding audio data.

Further, the present apparatus may utilize a common buffer memory for video data and audio data. Such use of a common buffer memory may result in an increase in processing speed and may reduce the complexity or scale of the circuit.

Furthermore, the present invention a device for graphic processing of video data so that images with frames and characters may be recorded.

Other objects, features and advantages according to the present invention will become apparent from the following detailed description of illustrated embodiments when read in conjunction with the accompanying drawings in which corresponding components are identified by the same reference numerals.

BRIEF DESCRIPTION OF THE DRAWINGS

FIGS. 1A and 1B are perspective views of an electronic still camera according to an embodiment of the present invention;

FIG. 1C is a diagram of a magneto-optical disk cartridge which may be used with the electronic still camera of FIGS. 1A and 1B;

FIG. 12 is a diagram of a narration table;

DETAILED DESCRIPTIONS OF THE PREFERRED EMBODIMENTS

Figure 2:
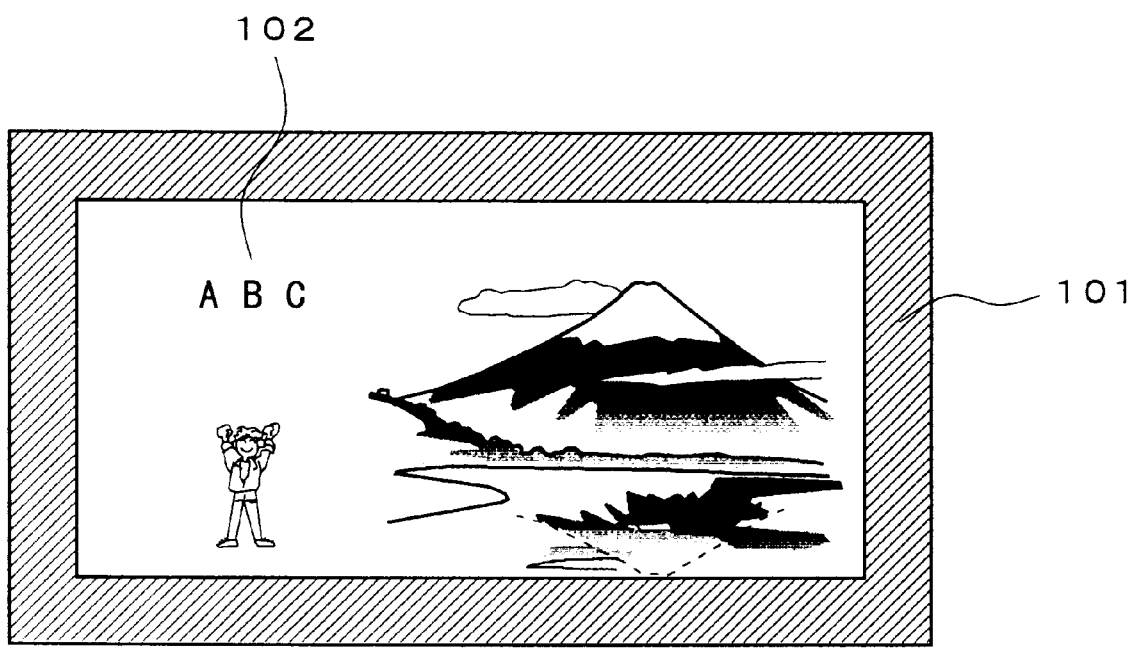
FIG. 2 is a diagram to which reference will be made in explaining the display of patterns and characters.

The preferred embodiment of the present invention will now be described with reference to the accompanying drawings.

FIGS. 1A and 1B illustrate a digital type electronic still camera. Such electronic still camera is adapted to compress a digital still image video signal in accordance with a JPEG technique and to record the compressed signal on a magneto-optical disk which may be similar to a MD (minidisk) and to reproduce a recorded signal from such MD, as hereinafter more fully described.

PCT application No. JP95/01912 filed Sep. 21, 1995 entitled "Still Picture System" is hereby incorporated by reference.

As shown in FIGS. 1A and 1B, the present electronic still camera includes a main camera body 1 having a front surfaces 1A, a back surface 1B, a top surface 1C and side surfaces 1D and 1E. A lens 2 is arranged on the front surface 1A. The lens 2 is adapted to receive an image or light rays from an object to be photographed. A microphone 11 adapted to receive or collect external sounds is also arranged on the front surface 1A. A liquid crystal display 3 is arranged on the back surface 1B. The liquid crystal display 3 is adapted to display an image to be photographed or a reproduced image. Such liquid crystal display 3 may be utilized as a view finder. A shutter switch 4 and other various switches 5 are arranged on the top surface 1C. A video output terminal 6 and audio output terminals 10A and 10B are arranged on the side surface 1D. A disk loading aperture 8 is arranged on the other side surface 1E. Such disk loading aperture 8 is adapted to receive a recording medium such as a cartridge 9 containing a magneto-optical disk 51 shown in FIG. 1C.

The magneto-optical disk 51 may have a diameter of approximately 64 mm. The magneto-optical disk/cartridge arrangement may be similar to a musical or audio MD (minidisk), such as that previously described. Additional details pertaining to the magneto-optical disk 51 are provided in PCT application No. JP95/01912, which has been incorporated by reference herein.

Figure 3:
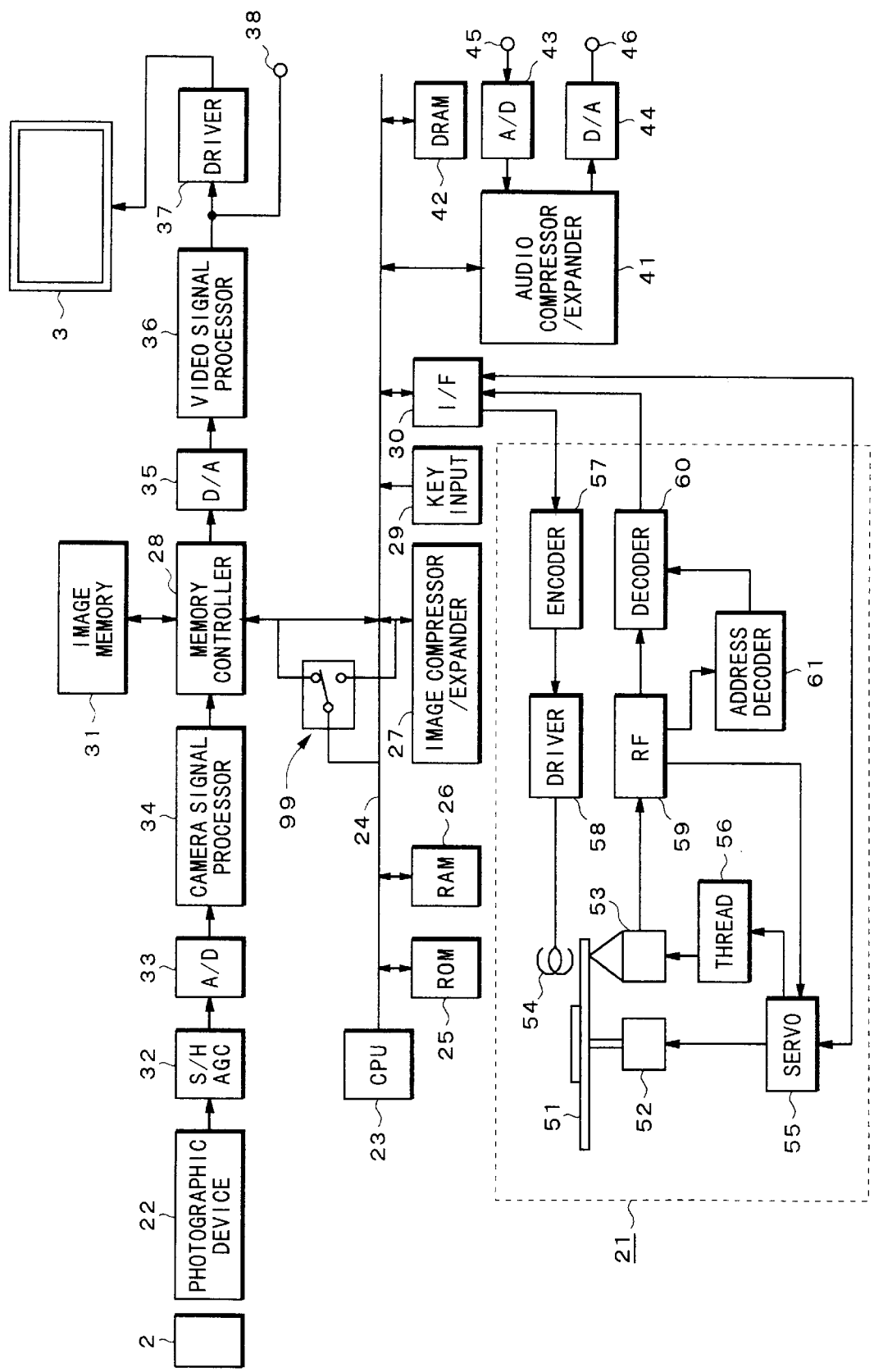
FIG. 3 is a diagram of the electronic still camera of FIGS. 1A and 1B.

In operation, the lens 2 is oriented to a desired object when the electronic still camera is used to take a photograph. An image of such object is supplied through the lens 2 and is opto-electrically converted by a CCD photographic device 22 (FIG. 3) included in the main camera body 1 so as to form an image signal which is stored in an image memory 31 (FIG. 3) included in the main camera body and which is displayed on the liquid crystal display 3. When the shutter button 4 is activated or depressed, a still image corresponding to the image received through the lens 2 is recorded on the disk 51 in the cartridge 9.

A still image recorded on the magneto-optical disk 51 may be reproduced and displayed on the liquid crystal display 3. The still image recorded on the magneto-optical disk 51 may also be displayed on an external display screen, such as that of a television, if the video output terminal 6 of the main camera body 1 is coupled to a video input terminal of such television. Additionally, the still image recorded on the magneto-optical disk 51 may be retrieved or provided to a computer, such as a personal computer, and may be compiled therein with other data by utilizing an image compiling application program.

Therefore, a currently photographed image may be displayed on the liquid crystal display 3. Additionally, as shown in FIG. 2, the liquid crystal display 3 may display characters 102 and a pattern or patterns 101. The characters 102 may describe information pertaining to the camera or the respective image, such as, the current mode of operation, place and date of the photograph, and so forth. The patterns 101 may provide a frame or ornamentation for the display. These characters and/or patterns may be recorded on the magneto-optical disk 51 together with the image(s) by use of the keys 29.

Sound collected by the microphone 11 may be recorded on the magneto-optical disk 51 in the cartridge 9. Audio signals reproduced from the magneto-optical disk 51 may be outputted from the audio output terminals 10A and 10B.

The present electronic still camera will now be more fully described with reference to FIG. 3A.

The present electronic still camera generally includes the lens 2, the CCD device 22, a sample and hold and automatic gain control (AGC) circuit 32, analog-to-digital (A/D) converters 33 and 45, a camera signal processing circuit 34, a memory controller 28, an image memory 31, digital-toanalog (D/A) converters 35 and 44, a video signal processing circuit 36, a liquid crystal driving circuit 37, the liquid crystal display 3, a computer processing unit (CPU) 23, a ROM 25, a random access memory (RAM) 26, an image compressing/expanding circuit 27, input key(s) 29, an interface 30, an audio compression/expanding circuit 41, a dynamic random access memory (DRAM) 42, and a magneto-optical disk drive circuit 21 which are connected as shown in FIG. 3A. The magneto-optical disk drive circuit 21 generally includes a motor 52, an optical pick-up 53, a magnetic head 54, a servo circuit 55, a thread mechanism 56, an encoder 57, a driver 58, a RF circuit 59, a decoder 60, and an address decoder 61 which are connected as shown in FIG. 3A.

The CPU 23 may control record/reproduce processing of the camera. For example, the CPU 23 may control the processing for recording video signals captured by the CCD photographic device 22 on the magneto-optical disk 51 in a compressed form, processing for expansion and reproduction of signals read from the magneto-optical disk 51, and so forth.

A CPU bus 24 connects the CPU 23, the ROM 25, the RAM 26, the image compression/expansion circuit 27, the memory controller 28, input keys 29, the audio compression/expansion circuit 41, the DRAM 42 and the magneto-optical disk drive 21 through the interface 30.

The input keys 29 may enable an operator to input a desired command or function. One of the input keys 29 may be the shutter switch 4.

The ROM 25 and the RAM 26 may be utilized to store programs and/or information for use in the operation of the present camera.

The magneto-optical disk (or optical disk) 51 contained in a cartridge 9 may be loaded into the magneto-optical disk drive 21. A digital video signal compressed by a JPEG technique or a digital audio signal may be recorded on and reproduced from the magneto-optical disk 51. Data stored on the magneto-optical disk 51 may be accessed by use of respective addresses. Such addresses may be provided or recorded in accordance in a so-called Wobble format.

The magneto-optical disk 51 is rotated by the spindle motor 52. The optical pick-up 53 and the magnetic head 54 are arranged so as to be adjacent to the magneto-optical disk 51 and are adapted to move in a radial direction across the disk 51 by the thread mechanism 56. The servo circuit 55 receives a focus and tracking error signal from the RF circuit 59 and, in response thereto, generates a control signal(s) which is supplied to the spindle motor 52 and the thread mechanism 56. As a result, the spindle motor 52 and the thread mechanism 56 are controlled which, in turn provides focus and tracking control of a double-shaft or two-axes device of the optical pick-up 53.

As hereinafter more fully described, data to be recorded is supplied through the interface 30 to the encoder 57 so as to be encoded in a predetermined manner. An encoded signal from the encoder 57 is supplied to the magnetic head 54 by way of the driver 58. As a result, a laser beam from the optical pick-up 53 and a modulated magnetic field from the magnetic head 54 are applied to the magnetic disk 51.

During reproduction, a laser beam from the optical pick-up 53 is irradiated onto the magneto-optical disk 51 and reflected light therefrom is supplied to the RF circuit 59, wherein a reproduced signal is obtained. Such reproduced signal is supplied to the decoder 60 and the address decoder 61. The address decoder decodes or detects the Wobble addresses and provides a output to the decoder 60. As a result, a decoded signal is formed and supplied from the decoder 60 to the interface 30.

The lens 2 is disposed in front of the CCD photographic device 22. During recording, light from an object to be photographed is supplied through the lens 2 and focused onto a light detecting plane of the CCD photographic device 22 so as to be photo-electrically converted to an image signal. Such image signal is supplied through the sample and hold and/or AGC circuit 32 to the A/D converter 33 so as to be converted into digital form. The digital image signal from the A/D converter 33 is supplied to the camera signal processing circuit 34 so as to form component video signals, such as a luminance signal Y and chromatic difference signals R-Y (Red-Y) and B-Y (Blue-Y).

The data capacity or sampling rate of the Y, R-Y and B-Y Y signals from the camera signal processing circuit 34 may be expressed as a ratio, such as a ratio of the luminance information Y to the chromatic information R-Y to the chromatic information B-Y. More than one video signal ratio or mode may be utilized. For example, video modes or ratios of 4:2:0 (Main profile at main level) and 4:2:2 (Option) may be utilized.

According to ITU-R (ITU-Radio communication Sector) recommendation BT,601, the luminance signal Y is sampled at 13.5 MHz, and the chromatic signals are each sampled at 6.75 MHz (13.5/2 MHz). Such sampling rates may provide the 4:2:2 ratio.

On the other hand, the ratio of 4:2:0 may not always be fixed. That is, such ratio may change between 4:2:0 and 4:0:2 depending upon the respective line of a field. More specifically, on an odd line of a field, the ratio of Y:R-Y:B-Y may be 4:0:2. On the other hand, on an even line of the field, the ratio of Y:R-Y:B-Y may be 4:0:2. Thus, the ratio 4:2:0 and 4:0:2 is dependent upon the respective line and provides an indication or difference between the odd or even line of a field.

The camera signal processing circuit 34 may also perform additional processing, such as that pertaining to gamma correction, aperture correction, shading processing, and so forth.

Under control of the memory controller 28, the video signal from the camera signal processing circuit 34 is supplied to the image memory 31 and then to the D/A converter 35 so as to be converted into analog form. An analog output signal from the D/A converter 35 is supplied to the video signal processing circuit 36. An output from the video signal processing circuit 36 may be supplied through the liquid crystal driver 37 to the liquid display 3. Such liquid display 3 may be used as a view finder during photographing. The video signal processing circuit. 36 may also form a composite video signal from the received analog signal. Such composite signal may have a predetermined format, such as that corresponding to an NTSC (national television system committee) format. The composite signal may be outputted from an analog video signal output terminal 38.

When the shutter button 4 (FIG. 1) is pressed during recording, a video signal of an image may be supplied to the image memory 31. That is, the video signal supplied to the image memory 31 may be first supplied to the image compression/expansion circuit 27 by way of the CPU bus 24. The image compression/expansion circuit 27 is adapted to compress and expand a digital video signal in accordance with a JPEG technique, wherein such JPEG compression technique may involve DCT conversion and variable-length coding of the digital video signal. The compressed video signal from the image compression/expansion circuit 27 may be supplied by way of the controller 28 to the image memory 31.

The compressed video signal from the image compression/expansion circuit 27 may be further supplied to the encoder 57 of the magneto-optical disk drive 21 by way of the CPU bus 24 and interface 30. The encoder 57 is adapted to perform error correction coding, such as that in accordance with ACIRC (Advanced Cross Interleaved Reed Solomon Coding), and to modulate the received signal in accordance with a predetermined modulation technique, such as a so-called eight-to-fourteen modulation technique. An output of the encoder 57 is supplied through the driver 58 to the magnetic head 54. The optical pick-up 53 directs a laser beam onto the magneto-optical disk 51, and a magnetic field modulated by an output of the encoder 57 is applied to the magnetic head 54. As a result, a video signal in compressed form may be recorded on the magneto-optical disk 51.

Alternatively, a video signal to be recorded on the magneto-optical disk 51 may be selectively processed so as to be in either compressed or uncompressed form. That is, if it is desired to record an uncompressed video signal, the video signal from the camera signal processing circuit 34 may be provided to the encoder 57 by way of the memory controller 28, the CPU bus 24 and the interface 30 without being compressed by the image compression/expansion circuit 27. On the other hand, if it is desired to record a compressed video signal, the video signal from the camera signal processing circuit 34 may be provided to the image compression/expansion circuit 27 so as to be compressed prior to being supplied to the encoder 57, in a manner similar to that previously described. The routing of signals or selection as to whether a video signal to be recorded is compressed or not may be controlled by the CPU 23. Such selection operation may be performed by a switching device 99 which is controlled by the CPUr 23.

During recording, the video signal stored in the image memory 31 is supplied to the D/A converter 35 and an output therefrom is supplied to the video signal processing circuit 36. An output of the video signal processing circuit 36 is supplied through the liquid crystal driver 37 to the liquid crystal display 3. As a result, the photographed image is displayed on the liquid crystal display 3.

As hereinafter more fully described, the image memory 31 includes a luminance signal data area, a chromatic signal data area, a pattern data area and a character data area. Pattern data and character data may be respectively supplied to the pattern data area and character data area. The pattern data and character data may be combined with the luminance signal data and chromatic signal data. The video data incorporating the pattern data and the character data may be displayed on the liquid crystal display 3 and recorded on the magneto-optical disk 51.

During reproduction, an image to be reproduced is identified or designated by use of the input keys 29. Upon such designation, the optical pick-up 53 may be moved to the location or address corresponding to the designated recorded image, and compressed video signals representative of the designated image may be retrieved from the magneto-optical disk 51. In a manner similar to that previously described, such retrieved or reproduced signal is supplied to the decoder 60 by way of the RF amplifier 59 so as to be decoded or processed thereat. For example, such processing may involve data demodulation, error correction, and so forth. An output of the decoder 60 is supplied to the DRAM 42 by way of the interface 30 and the CPU bus 24 and stored therein. Data from the DRAM 42 is supplied to the image compression/expansion circuit 27 by way of the CPU bus 24. The image compression/expansion circuit 27 expands the received JPEG-compressed video signal which may be stored in the image memory 31 under the control of the memory controller 28. The stored video signal from the image memory 31 is supplied to the D/A converter 35 so as to be converted into analog form which is supplied to the video signal processing circuit 36. An output of the video signal processing circuit 36 is supplied to the liquid crystal display 3 by way of the liquid crystal driver 37. The video signal processing circuit 36 may form a composite videos signal having a predetermined or NTSC format. Such composite video signal may be outputted at the analog signal output terminal 38.

The present electronic still camera may record and/or reproduce still image data and audio data. When audio data is recorded, audio signals are supplied through the input terminal 45 to the A/D converter 43 so as to be converted into digital form. A digital audio output signal from the A/D converter 43 is supplied to the audio compression/expansion circuit 41 and compressed thereat. The compressed audio data is once stored in the DRAM 42, and then supplied to the encoder 57 of the magneto-optical disk drive 21 through the interface 30. After the encoder 57 executes error correction coding and modulation, the compressed audio signals are recorded.

When audio data is reproduced, compressed audio data from the magneto-optical disk 51 is reproduced therefrom in a manner similar to that previously described with regard to the image data. The reproduced compressed audio data is supplied to the decoder 60 by way of the RF amplifier 59. A decoded compressed audio signal from the decoder 60 is supplied by way of the interface 30 and the CPU bus 24 to the DRAM 42 so as to be stored therein. Such stored audio signal is supplied from the DRAM 42 to the audio compression/expansion circuit 41 and expanded thereat. The audio signal is then supplied to the D/A converter 44 and converted to analog form and outputted from the output terminal 46.

The method used for compressing and/or recording the audio signal may be similar to that used for compressing and/or recording musical-type MD's. Accordingly, a musical MD may be inserted into the magneto-optical disk drive 21, whereupon the present electronic still camera may be used as a musical MD player.

Audio information corresponding to video information may be recorded/reproduced to/from the recording medium 51 by utilizing a predetermined file structure. Such file structure may provide a so-called management area wherein management data may be provided for controlling predetermined operations. The file structure may further provide a so-called program area wherein data such as video and audio data may be provided. Accordingly, by utilizing such file structure, the medium 51 may have a management area and a program area. Details pertaining to one type of such file structure are presented below.

File structure:

File names conform to MS-DOS format as shown below:

PMF: management file
PMP: video data file
PMX: Index video data file
PMA: Audio data file
PMO: other data file
PMA File PMA file used as audio data file.

File name: NR*nnnnn. PMA

This file name presents narration data file (An audio data file corresponding to a video image file).

The nnnnn means number.

The video image file corresponding to the audio data file is discriminated by the number (nnnnn).

PMA file

Audio data file

NRA nnnnn.PMA

This file is mandatorily read and written in equipment which has a narration function.

The content of this file is free.

nnnnn:number

NRB nnnnn.PMA

This file is optical in equipment which has a narration function. No read and write function is allowed. The content of this file is free.

nnnnn:number

NRC-NRGnnnnn. PMA

This file is optional in equipment which has a narration function. No read and write function is allowed. This file is for multi-lingual applications.

nnnnn:number

MSCnnn.PMA file

This file is a BGM data file for slide shows using multiple images.

nnn:number

Figure 11:
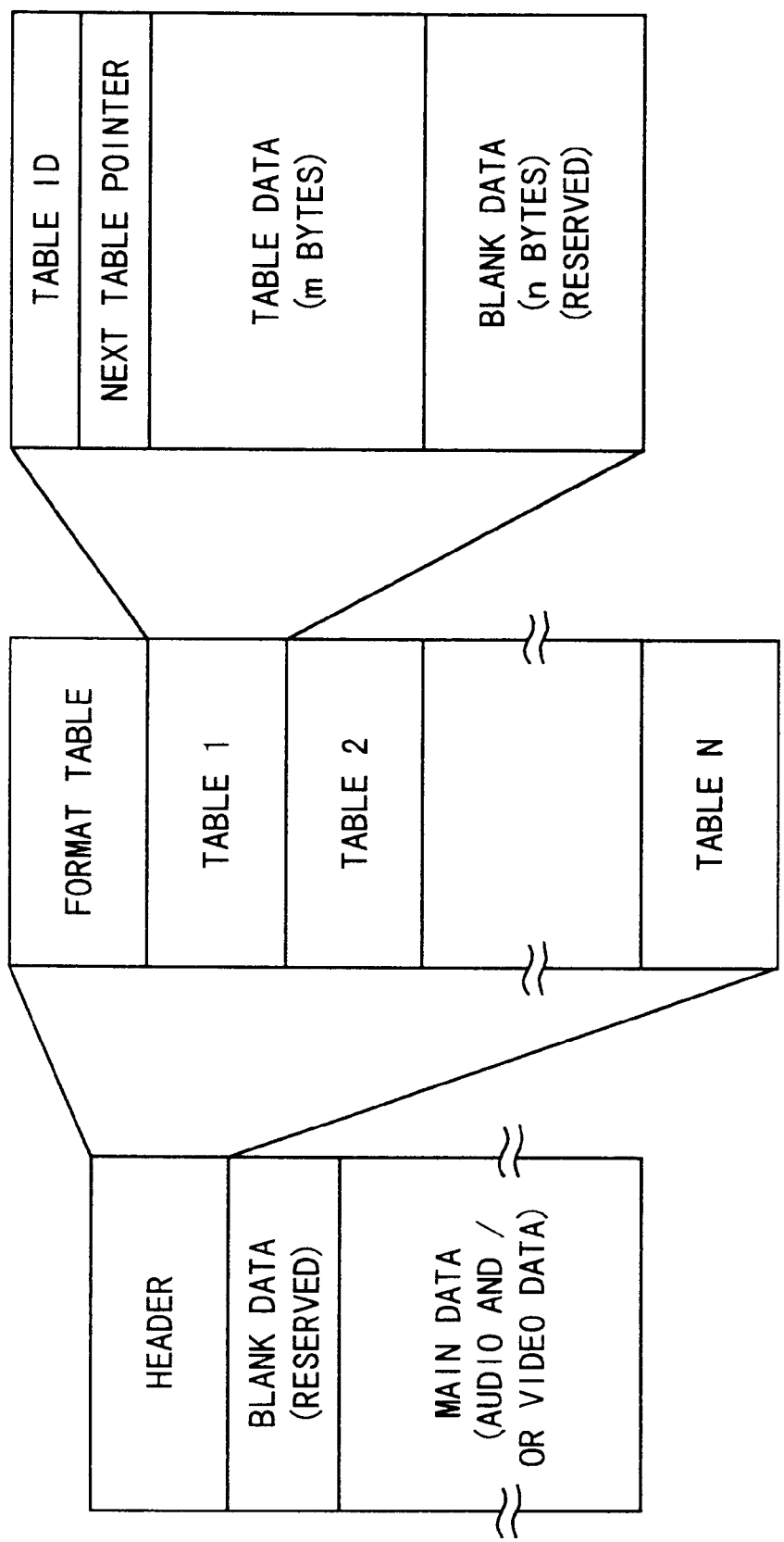
FIG. 11 is a diagram of a file/header/table structure.

See FIG. 11, for an illustration of a file structure, header structure and table structure.

Types of tables -

| Table type | ID |
| --- | --- |
| Format table | 10 h |
| Description table | 11 h |
| Comment table | 12 h |
| Copyright information table | 13 h |
| Disc ID table | 24 h |
| Image parameter table | 20 h |
| Record information table | 21 h |
| Color management parameter table | 22 h |
| Divided-picture management table | 23 h |
| Camera information table | 24 h |
| Scanner Information table | 25 h |
| Appearance information table | 26 h |
| Narration table | 30 h |
| BGM table | 31 h |
| Laboratory information table | 40 h |
| Optional table | 90 h |

Format version

File form: Sort of file form

20h: NR*nnnnn.PMF file Narration data file

21h: MSCnnn.PMA file BGM data file

See FIG. 12

Field definitions

Mode Audio mode is indicated in b0 to b3.

Total time Total time of narration in ½ second units Not defined:FFFFH

Start time Actual start time in ½ second units Not defined-:FFFFh

Effective time Actual start time to actual end time in ½ second units Not defined:FFFFh Character set code 00h:ASCII 01h:ISO-8859-1 02h:Shifted JIS Other:Reserved Name Name is described by Character set code.

In addition to a narration mode, other modes are also available. For example, a so-called BGM or background music mode may also be provided. Such mode may be utilized for providing background music. The narration mode and BGM mode may have similar arrangements or structures.

Figure 13:
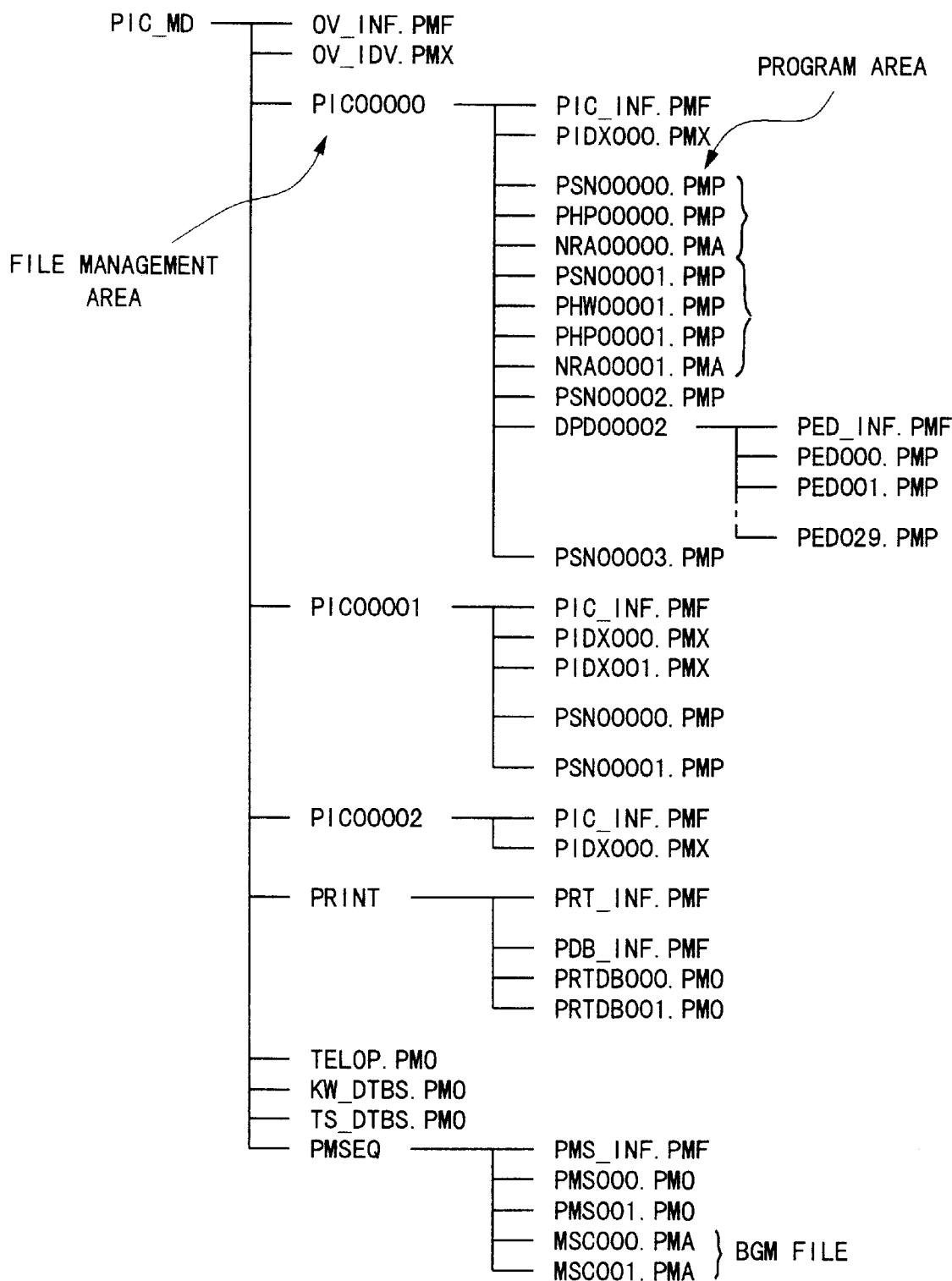
FIG. 13 is a diagram of a directory structure.

FIG. 13 illustrates an,example of a directory structure.

Figure 14:
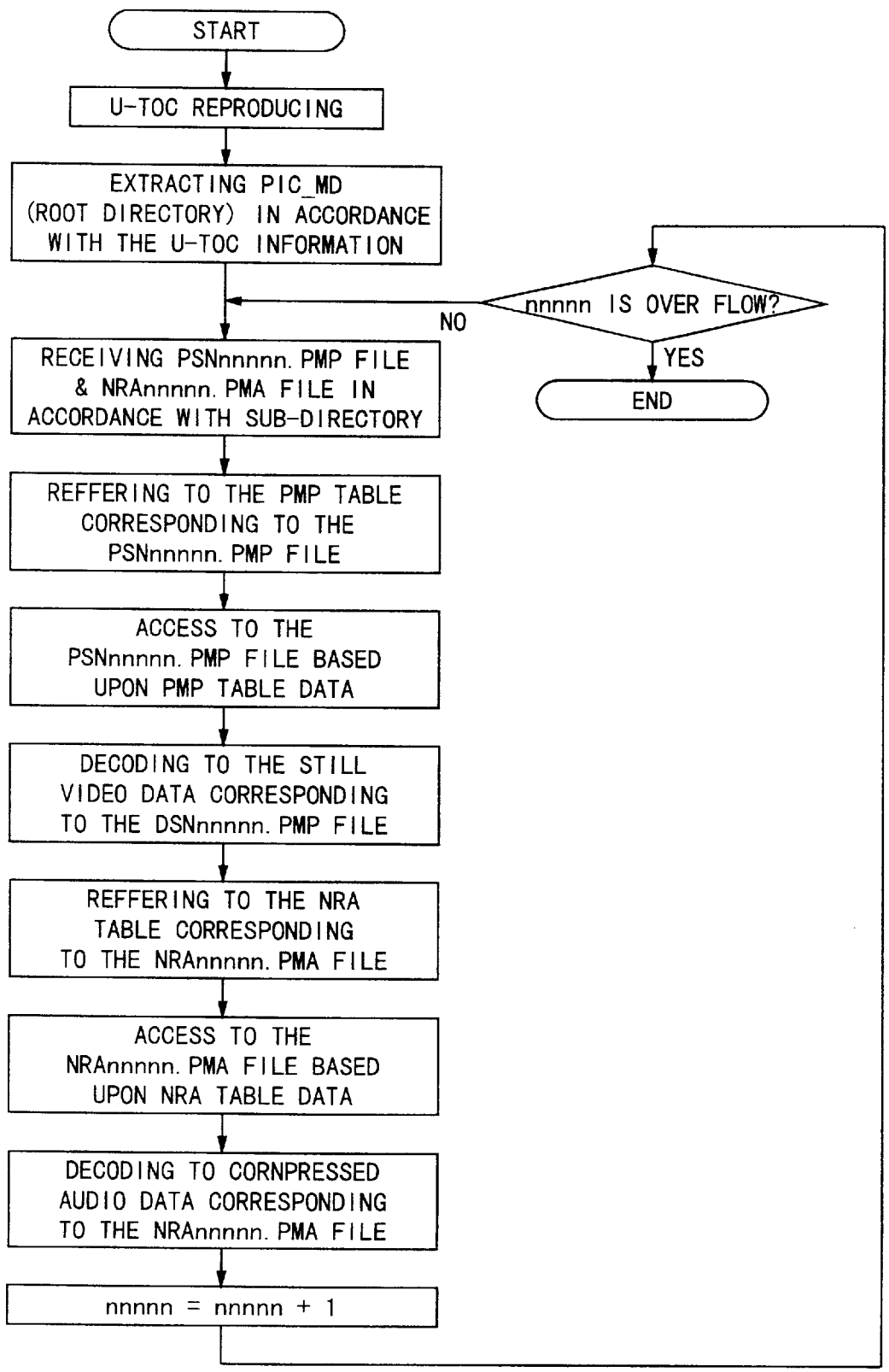
FIG. 14 is a flow chart.

An operational flow chart is provided in FIG. 14. An explanation of such flow chart is provided below.

If a user wishes to reproduce a still image, the user operates the operation key(s) such that the system accesses a U-TOC (user Table of Content) information and reads the PIC-MD as a directory management file. A system controller controls the optical pick-up so as to access the still image data file and the narration data file corresponding to the image data file in accordance with the PICnnnn(n:number) directory data which is managing the image data and narration data. The Narration data file is managed by the PMA file of the PICnnnnn directory data and the Image data file is managed by the PMX file of the PICnnnnn directory data. The system controller controls the display means so as to display the running time, remaining time etc. in accordance with Total time, Start time, and Effective time of the Narration Table data. Further, the system controller also controls the display means so as to display a title corresponding to name, data etc. in accordance with Title and Character Identification Code of the Narration Table data.

End of File Structure Description

In addition to a currently photographed image, the present digital type electronic still camera also enables characters (which may indicate the current mode of operation, place and date of the photograph, and so forth) and patterns or ornamentations for a frame of the display to be displayed on the liquid crystal display 3 during recording. These characters and framing and ornamental patterns may be recorded on the magneto-optical disk 51 by use of the input keys 29. Such patterns and characters may be stored in a respective region or regions of the image memory 31 other than the regions for luminance and chromatic data of the photographed image. The original image may be recorded on the magneto-optical disk 51 without the patterns and characters.

The present digital type electronic still camera may record a photographed image in a relatively large size or scale, a relatively small size or scale, or a modified form. That is, the DRAM 42 may be utilized as a buffer memory when video signals and/or audio signals are recorded or reproduced. Such use of the DRAM 42 enables the size or scale of an image to be increased or decreased or modified. For example, when it is desired to enlarge an image, the video signal of the photograph or image may be stored in the image memory 31. The video signal from the image memory 31 may be compressed by the image compression/expansion circuit 27, and stored in the DRAM 42. To enlarge the image, data in the DRAM 42 is accessed, expanded in the image compression/expansion circuit 27, and stored in the image memory 31. As is to be appreciated, similar processing may be performed when it is desired to decrease or modify an image.

Further, since the compressed data may be stored in the DRAM 42, such data may be accessed through the DRAM 42 instead of through the magneto-optical disk 51. As a result, the processing speed may be increased.

As explained above, patterns or characters to be displayed on an image plane may be stored in a respective region or regions of the image memory 31 which are separate from those for luminance and chromatic data of the image(s). This arrangement is more fully described hereinbelow.

Figure 4:
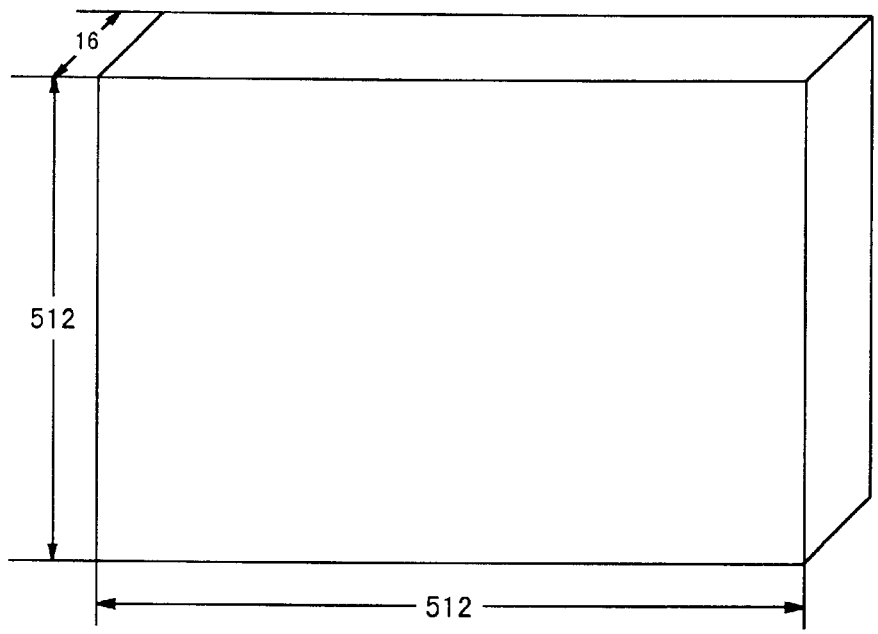
FIG. 4 is a diagram to which reference will be made in explaining an image memory in the electronic still camera of FIGS. 1A and 1B.

A 4 megabyte video RAM, as shown in FIG. 4, may be utilized as the image memory 31. Such video RAM is 512 bits wide, 512 bits high and 16 bits thick. The data capacity of this image memory 31 is as follows:

$$512\times512\times16=4{,}194{,}304 \text{ bits}$$

Figure 5:
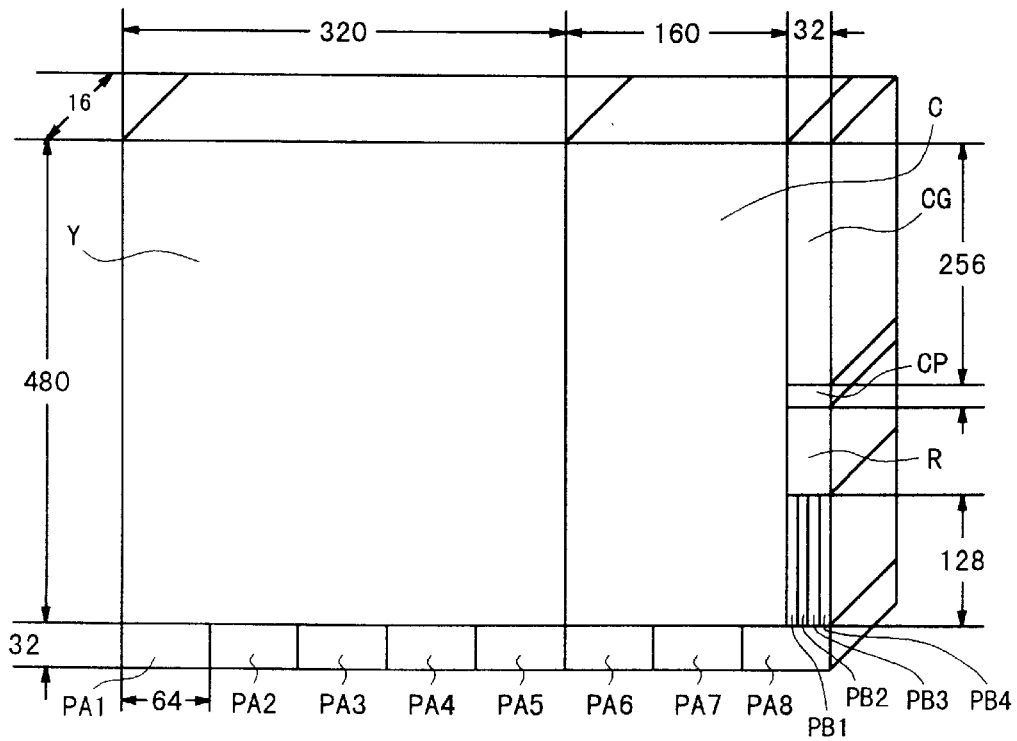
FIG. 5 is another diagram to which reference will be made in explaining the image memory in the electronic still camera of FIGS. 1A and 1B.

Data storage within the image memory 31 may be allocated as shown in FIG. 5 in which "Y" indicates the area for luminance signal data, "C" indicates the area for chromatic signal data, "CG" indicates the area for character data, "PA1" to "PA8" and "PB1" to "PB4" indicate areas for pattern data, "CP" indicates a color palette area, and "R" indicates a reserved area. The luminance data area Y is 320 bits wide (along a horizontal direction), 480 bits high (along a vertical directions and 16 bits deep.

An image plane may contain 640 pixels in a horizontal direction by 480 pixels in a vertical direction. Such image plane contains 640×480=307,200 pixels or samples. This corresponds to the number of effective pixels in a NTSC image plane.

Figure 6A:
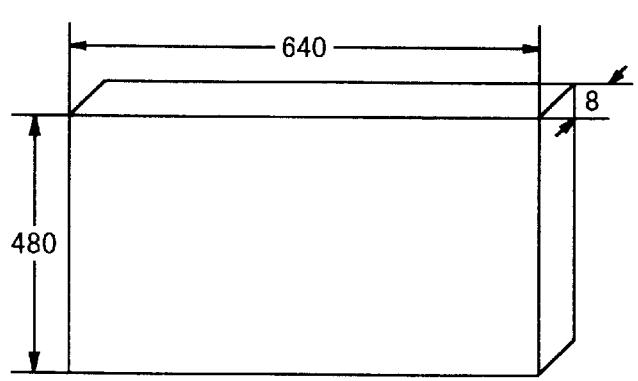
FIGS. 6A and 6B are other diagrams to which reference will be made in explaining the image memory in the electronic still camera of FIGS. 1A and 1B.

Consider the situation in which a luminance data signal is quantized by 8 bits. In this situation, the luminance data signal data may contain 640×480×8=2,457,600 bits. Accordingly, in this situation, a storage area having a capacity of at least 2,457,600 bits, such as that shown in FIG. 6A, shoul(d be used for the luminance data signal.

Figure 6B:
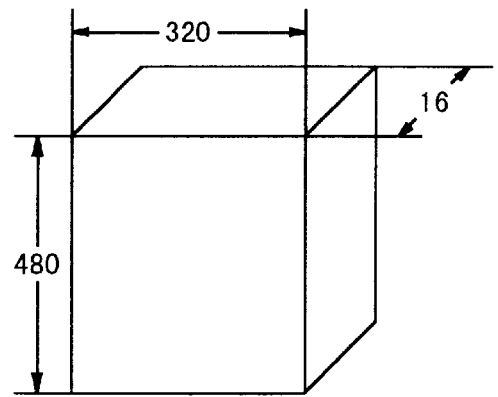
Figure 7:
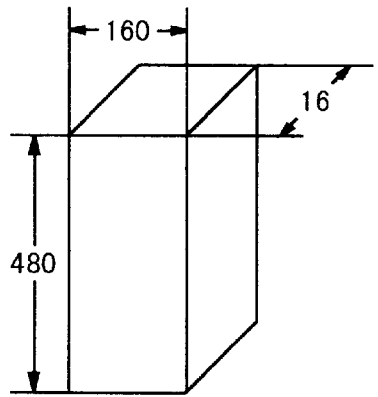
FIG. 7 is another diagram to which reference will be made in explaining the image memory in the electronic still camera of FIGS. 1A and 1B.

By utilizing a video RAM having a depth of 16 bits as the image memory 31, the above-described 2,457,600 bits of luminance signal data may be stored within an area Y having a size of 320 bits wide by 480 bits high as shown in FIG. 6B. (That is, 320×480×16=2,457,600 bits which equals the number of bits in the luminance signal data.)

Therefore, the luminance signal data area Y having an area of (320 bits ×480 bits), as shown in FIG. 5, is sufficient for storing the luminance signal data.

With regard to the chromatic data, the chromatic data area C is 160 bits wide (along a horizontal direction), 480 bits high (along a vertical direction) and 16 bits deep, as shown in FIG. 5. More specifically, chromatic signals CR and CB each may have approximately ¼ the amount of information or data as compared to the luminance signal data. Accordingly, the storage capacity for each of the chromatic signal CR and the chromatic signal CB should be:

$$(640\times480\times8)/4=614{,}400 \text{ bits}$$

As a result, the total storage capacity for the chromatic signals CR and CB should be 1,228,800 bits.

Thus, the chromatic data area C should have a storage area of 160 bits wide by 480 bits high when a video RAM having a depth of 16 bits is utilized, such as shown in FIG. 5. Such size storage area may accommodate $$160\times480\times16=1{,}228{,}800 \text{ bits.}$$

Therefore, the chromatic signal data area C having an area of (160 bits×480 bits), as shown in FIG. 5, is sufficient for storing the chromatic signal data.

The sum of the luminance signal data area Y and the chromatic signal data area C is (480×480). On the other hand, the area of the video RAM of FIG. 4 is (512×512). Accordingly, a L-shaped area having a thickness of 32 bits in both the horizontal and vertical directions is still available. Such L-shaped area may be used for the pattern data areas PA1 to PA8 and PB1 to PB4, and character data area CG, as hereinbelow more fully described.

With regard to the character data area, the character data area CG is 32 bits wide by 256 bits high by 16 bits deep, as shown in FIG. 5. Accordingly, the character data area CG has a storage capacity of $$32\times256\times16=131{,}072 \text{ bits.}$$

Figure 8A:
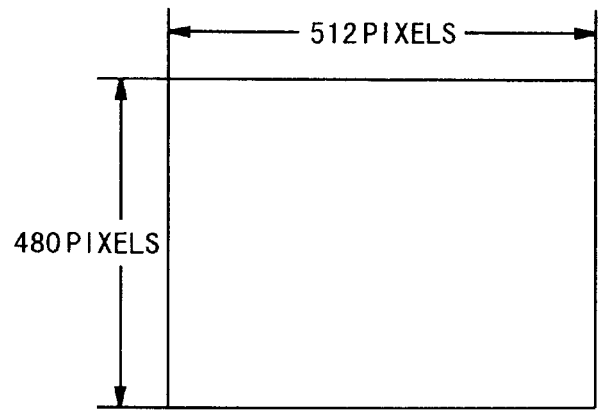
FIGS. 8A, 8B and 8C are other diagrams to which reference will be made in explaining the image memory in the electronic still camera of FIGS. 1A and 1B.
Figure 8B:
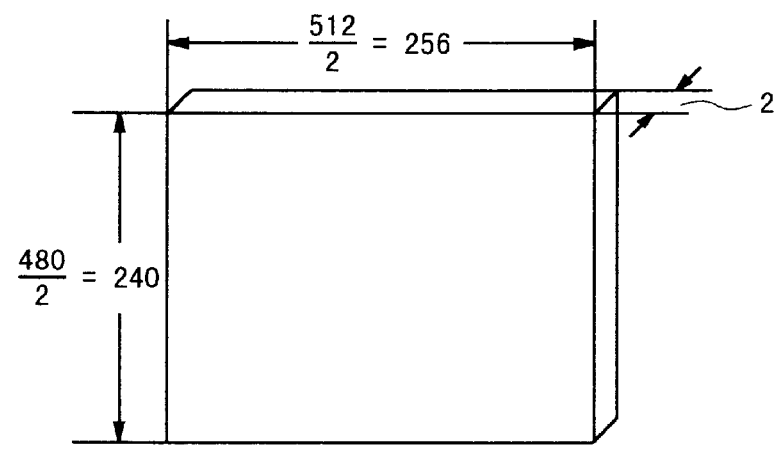

One image plane,for display of characters may have 512 pixels in a horizontal direction by 480 pixels in a vertical direction as shown in FIG. 8A. For display of a character, assume that four samples in the horizontal and vertical directions may be represented as one sample and expressed with two bits. In this situation, as shown in FIG. 8B, the storage capacity should be as follows:

$$(512/2)\times(480/2)\times2=122{,}880 \text{ bits.}$$

Figure 8C:
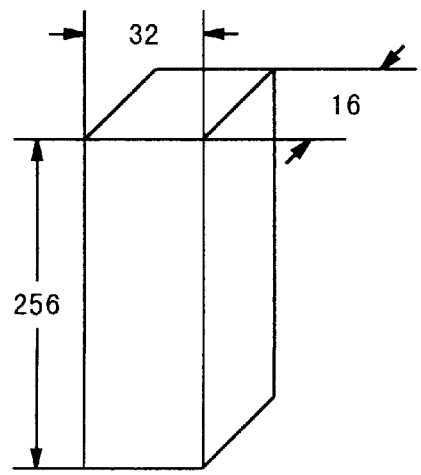

Thus, since the allocated storage area CG has a storage capacity larger than the needed storage capacity (i.e., 131,072 bits is larger than 122,880 bits), the character data area CG having an area of (32 bits×256 bits) when used with a video RAMA having a depth of 16 bits, as shown in FIGS. 5 and 8C, is sufficient for storing the character data.

With regard to the pattern data area, pattern data areas PA1 to PA8 each having a size of 64 bits wide×32 bits high and pattern data areas PB1 to PB4 each having a size of 8 bits wide×128 bits high may be utilized for storing pattern data, as shown in FIG. 5.

Figure 9A:
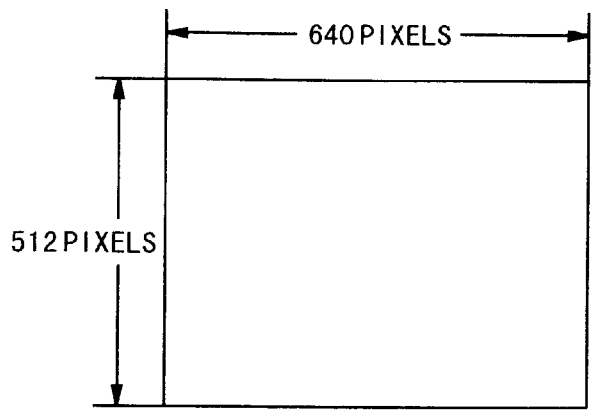
FIGS. 9A, 9B and 9C are other diagrams to which reference will be made in explaining the image memory in the electronic still camera of FIGS. 1A and 1B.
Figure 9B:
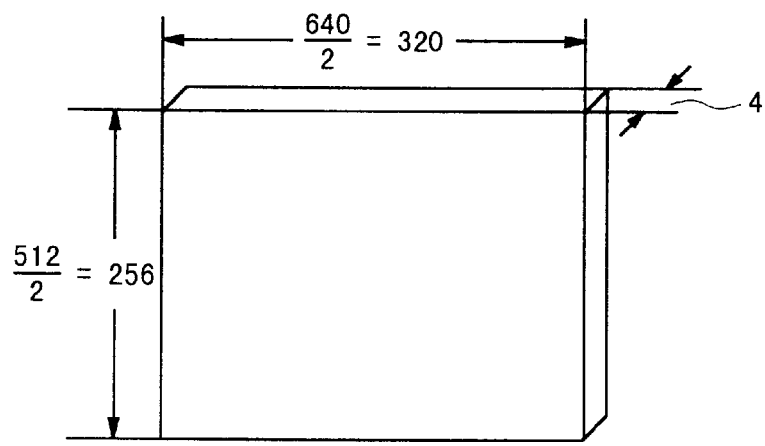

An image plane of pattern data may have 640 pixels in a horizontal direction and 512 pixels in a vertical direction as shown in FIG. 9A. This is slightly larger than the image plane for character data. For display of a pattern, assume that four samples in the horizontal and vertical directions may be represented as one sample which is expressed with four bits. In this situation, as shown in FIG. 9B, the storage capacity should be as follows:

$$(640/2)\times(512/2)\times4=327{,}680 \text{ bits}$$

Figure 9C:
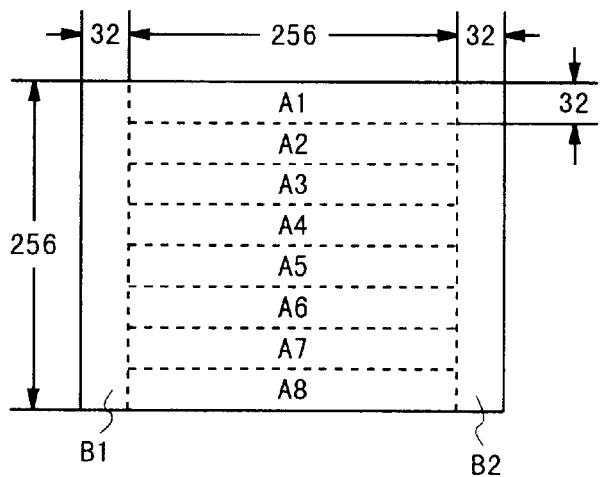
Figure 10A:
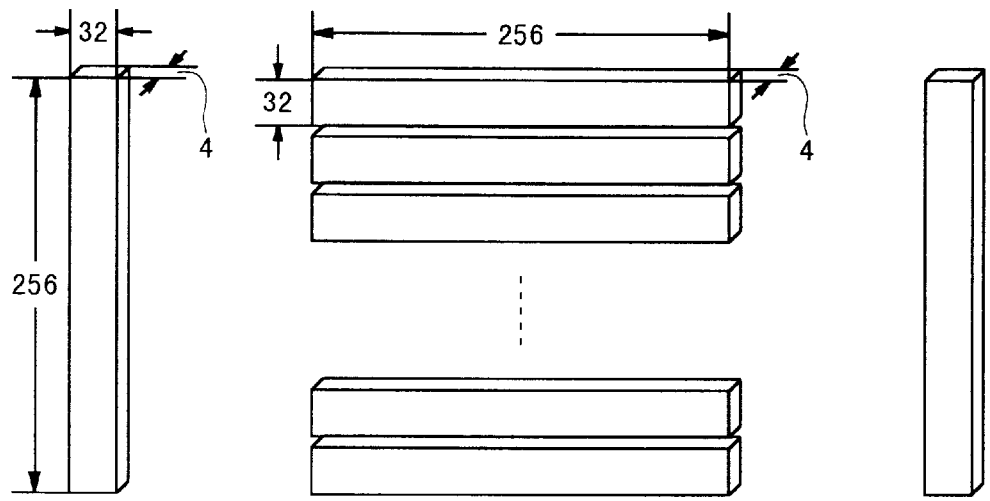
FIGS. 10A and 10B are other diagrams to which reference will be made in explaining the image memory in the electronic still camera of FIGS. 1A and 1B.

Each image plane of pattern data may be processed so as to have horizontally divided areas A1, A2, A3, ... A8 and vertically divided areas B1 and B2, as shown in FIG. 9C. As shown in FIG. 10A, each of the areas A1, A2, A3, ... A8 has a size of (256×32), and each of the areas B1 and B2 has a size of (32×256). Therefore, each of the areas A1, A2, A3, ... A8 should have a storage capacity of:

$$256\times32\times4=32{,}768 \text{ bits}$$

and each of the areas B1 and B2 should have a storage capacity of:

$$32\times256\times4=32{,}768 \text{ bits}$$

Figure 10B:
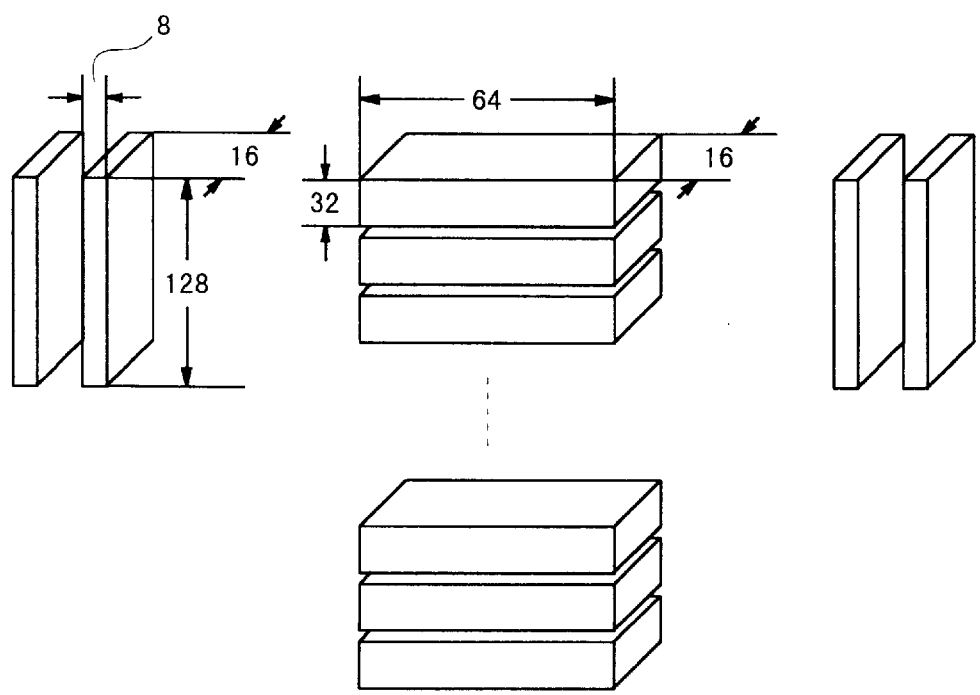

Each of the areas A1, A2, A3, ... A8 may utilize an area having a size of 64 bits wide by 32 bits high when allocated in a video RAM having a depth of 16 bits, as shown in FIG. 10B. That is, each such size enables 64×32×16=32,768 bits to be stored therein. Each of the areas B1 and B2 may utilize two 20 areas each having a size of 8 bits wide by 128 bits high when allocated in a video RAM having a depth of 16 bits. That is, each such size enables 8×128×16=16,348 bits to be stored therein.

Therefore, pattern data of the areas A1, A2, A3, ... A8 may be allocated respectively to the pattern data areas PA1, PA2, PA3, ... PA8 each having a size of (32×64) as shown in FIG. 5. Data of the area BE may be allocated to the pattern data areas PB2 and PB4 each having a size of (8×128), and data of the area B2 may be allocated to the pattern data areas PB1 and PB3 each having a size of (8×128).

The pattern data area described above with reference to FIG. 9A has a size of 640 pixels wide by 512 pixels high. In a NTSC image plane, the number of effective vertical lines or pixels is 480 and the number of effective horizontal lines or pixels is 512. In this situation, the storage capacity should be as follows:

480×512=245,760 bits.

Since 245,760/(32×64×16)=7.5 (areas), only 7.5 of the pattern data areas PA1, PA2, PA3 . . . PA8 of (32×64×16) are needed. Accordingly, one half of the area PA8 is unused.

On the other hand, in an image plane of a PAL (pulse alternation by line) system, the number of effective vertical lines (pixels) is 512 and the number of effective horizontal lines (pixels) is 512. In this situation, the storage capacity should be as follows:

512×512=262,144 bits.

Since 262,144/(32×64×16)=8 (areas), the capacity of the eight pattern data areas PA1, PA2, PA3 . . . PA8 of (32×64×16) are sufficient.

For character data using two bits, only four colors may be represented. For pattern data using four bits, only 16 colors may be represented. A color palette, which may be stored in the color palette area CP, may be utilized to enable representation of more colors.

Luminance data and chromatic data of a photographed image may be stored in and then read out from the luminance data area Y and the chromatic data area C of the image memory 31. When incorporation of characters or patterns into the image is desired, character data stored in the character data area CG or pattern data stored in the pattern data areas PA1, PA2, PA3, . . . and PB1 to PB4 are combined together by utilizing a microprogram, Thus, since the present apparatus includes a video compressing/expanding circuit for compressing/expanding video data and an audio compressing/expanding circuit for compressing/expanding audio data, the present apparatus may record or reproduce both a still image and audio data. Further, by utilizing a DRAM as a common buffer memory for both video and audio data, processing speed may be increased and the size or complexity of the circuit may be reduced. Furthermore, character data and/or pattern data may be added to video data and the combined data may be recorded. Since such character data and the. pattern data may be stored in an image memory along with the video (luminance and chromatic) data, an increase in the hardware or number of elements may be avoided.

Although the present camera was described as being used with a magneto-optical recording disk, the present invention is not so limited. Instead, other types of recording medium, such as magnetic tape, semiconductors, memory devices and the like, may be utilized.

Although a preferred embodiment of the present invention and modifications thereof have been described in detail herein, it is to be understood that this invention is not limited to this embodiment and modifications, and that other modifications and variations may be affected by one skilled in the art without departing from the spirit and scope of the invention as defined by the appended claims.

What is claimed is:

1. A camera apparatus for recording video and audio data to a recording medium having a predetermined management area and a plurality of predetermined program areas, said apparatus comprising:

video entry means for introducing video data;
   compression means for compressing the video data from the video entry means;
   video memory means for storing the compressed video data from the compression means;
   audio entry means for introducing audio data;
   audio compression means for compressing the audio data from the audio entry means; and
   recording means for recording the compressed video data and the compressed audio data to at least one of the following predetermined program areas: a management file area, an index file area, an audio data file area, and a video data file area of the recording medium, and for recording file management data to the predetermined management area for managing the compressed video data and the compressed audio data of the recording medium, wherein said recording means relates corresponding compressed video and audio data to each other by using the same number in their file names.

2. The camera apparatus according to claim 1, wherein the file management data manages the compressed video and audio data in accordance with a file name of the compressed audio and video data.

3. The camera apparatus according to claim 1, wherein the compressed video data is compressed in accordance with a JPEG format.

4. The camera apparatus according to claim 1, wherein the compressed audio data is compressed in accordance with an ATRAC (Adaptive Transform Acoustic Coding) format.

5. A camera apparatus for reproducing video and audio data from a recording medium having a predetermined management area and a plurality of predetermined program areas, said apparatus comprising:

reproducing means for reproducing compressed video and audio data in accordance with file management data stored in the predetermined management area and compressed video and compressed audio data stored in at least one of the following predetermined program areas: a management file area, an index file area, an audio data file area, and a video data file area of the recording medium;
   video memory means for storing the reproduced compressed video data from the reproducing means;
   expanding means for expanding the compressed video data from the video memory means;
   audio memory means for storing the reproduced compressed audio data from the reproducing means; and
   expanding means for expanding the compressed audio data from the audio memory means
   wherein said reproducing means reproduce the corresponding compressed video and audio data which have the same number in their file names continuously.

6. The camera apparatus according to claim 5, wherein the file management data manages the compressed video and audio data in accordance with the file name of the compressed audio and video data.

7. The camera apparatus according to claim 5, further comprising reproducing control means for controlling the reproducing means so as to access the compressed video data area before accessing the compressed audio data area in accordance with the file management data.

8. The camera apparatus according to claim 5, wherein the compressed video data is compressed in accordance with a JPEG format.

9. The camera apparatus according to claim 5, wherein the compressed audio data is compressed in accordance with an ATRAC (Adaptive Transform Acoustic Coding) format.

10. The camera apparatus according to claim 1, further comprising;

temporary memory means for temporarily storing in common said compressed video data and said compressed audio data from said video compression means and said audio compression means.

11. The camera apparatus according to claim 10, wherein;

the temporary memory means is a common memory buffer of a dynamic random access memory (DRAM).

12. The camera apparatus according to claim 5, further comprising;

temporary memory means for temporarily storing in common said reproduced compressed video data and said reproduced compressed audio data from said reproducing means.

13. The camera apparatus according to claim 12, wherein;

the temporary memory means is a common memory buffer of a dynamic random access memory (DRAM).

* * * * *